United States Patent [19]

Okubo

[11] Patent Number: 4,615,601
[45] Date of Patent: Oct. 7, 1986

[54] EXPOSURE CONTROL APPARATUS OF A CAMERA

[75] Inventor: Yuji Okubo, Omiya, Japan
[73] Assignee: Nippon Kogaku K. K., Tokyo, Japan
[21] Appl. No.: 685,301
[22] Filed: Dec. 24, 1984
[30] Foreign Application Priority Data Dec. 27, 1983 [JP] Japan ................. 58-248348

[51] Int. Cl.$^4$ ........................................ G03B 7/089
[52] U.S. Cl. .................................. 354/460; 354/486
[58] Field of Search ............... 354/460, 484, 461, 459, 354/486

[56] References Cited

U.S. PATENT DOCUMENTS

| | | | |
|---|---|---|---|
| 3,879,137 | 4/1975 | Sakazaki et al. | 354/484 |
| 3,956,757 | 5/1976 | Nomura et al. | 354/460 |
| 4,034,385 | 7/1977 | Arai | 354/460 |
| 4,232,955 | 11/1980 | Numata et al. | 354/460 |
| 4,350,426 | 9/1982 | Urata | 354/484 |
| 4,387,977 | 6/1983 | Uchidoi et al. | 354/484 |
| 4,389,108 | 6/1983 | Ohtsubo et al. | 354/484 |
| 4,429,974 | 2/1984 | Suzuki | 354/484 |
| 4,435,057 | 3/1984 | Nakai et al. | 354/460 |
| 4,460,264 | 7/1984 | Winter | 354/484 |

*Primary Examiner*—Russell E. Adams
*Attorney, Agent, or Firm*—Shapiro and Shapiro

[57] ABSTRACT

An automatic exposure control apparatus for a camera has the shutter release button and the memory shutter release button as switches with slidable contacts, a photodetector for detecting brightness of an object, a capacitor for holding the detected photometric value of the photodetector, and a bias circuit. When the shutter release button is depressed by a first stroke, power is turned on. After framing for a memory lock, the first stroke depression of the shutter release button is released, and the memory lock button is depressed. An exposure memory lock is completed. After framing for photography, the memory lock button is depressed again. Thereafter, the shutter release button is depressed by the first stroke, and a picture is taken. When the shutter release button is released and the memory clock button is released, the exposure memory lock is maintained. The exposure value held by the capacitor can be cancelled when the shutter release button is depressed by the first stroke while the memory lock button is released.

4 Claims, 6 Drawing Figures

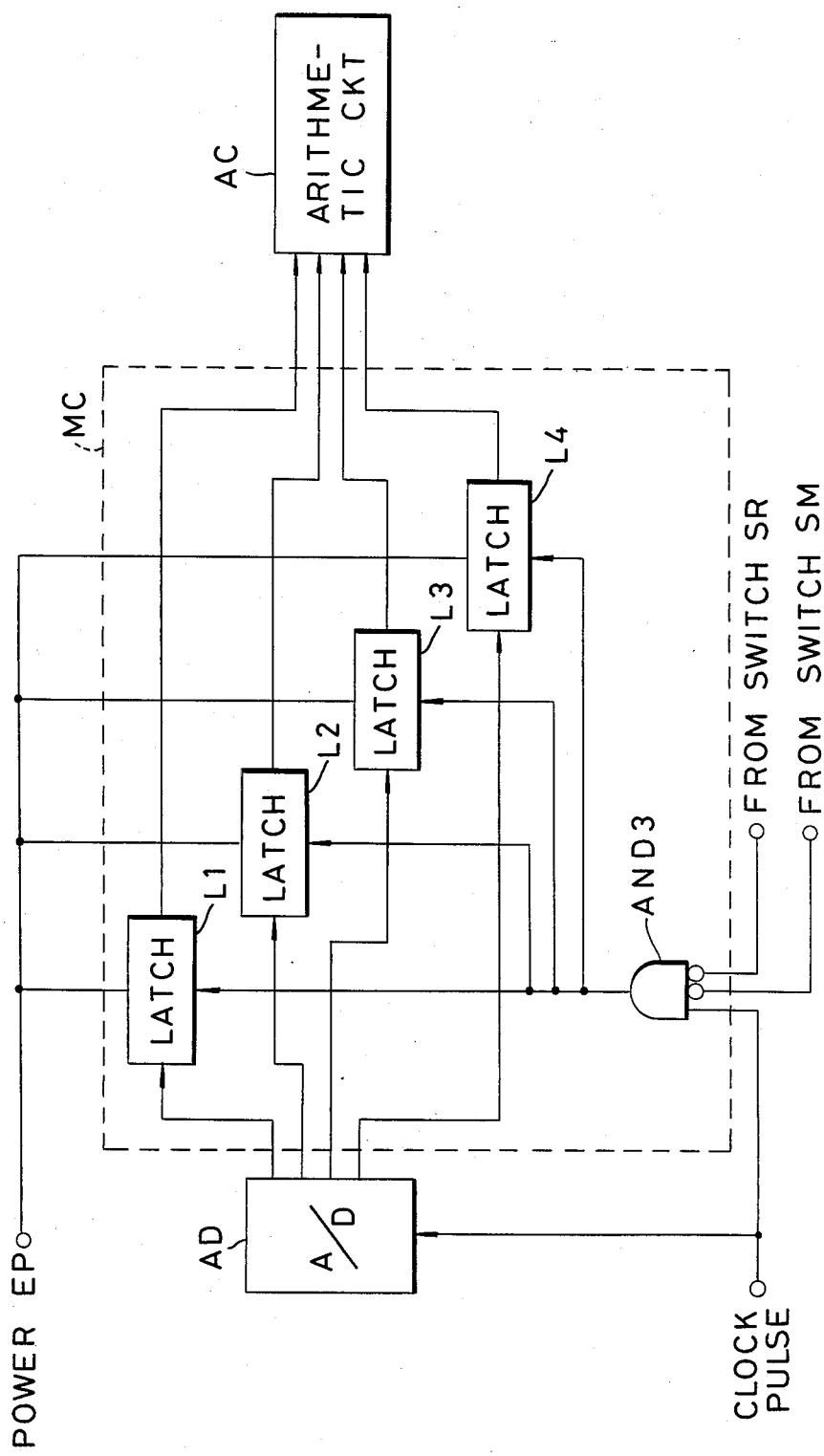

EXPOSURE CONTROL APPARATUS OF A CAMERA

BACKGROUND OF THE INVENTION

1. Field of the Invention

The present invention relates to an automatic exposure control apparatus of a camera and, more particularly, to an exposure memory lock apparatus for storing photometric values of any object portions and controlling an exposure in accordance with a readout photometric value.

2. Description of the Prior Art

In general, an exposure memory lock apparatus is operated such that a user locates an object for an optimal exposure at a center of a photometric portion, while observing the object through a viewfinder, a resultant photometric value is stored in a memory, and exposure control is performed in accordance with the stored photometric value even if framing changes at the time of photographing. A conventional exposure memory lock apparatus is proposed wherein photometric value is stored while the user keeps depressing a button. In this apparatus, the user must keep depressing the button if he wishes to store desired photometric value, thus restricting camera operations.

SUMMARY OF THE INVENTION

It is an object of the present invention to provide an exposure memory lock apparatus whose operability is greatly improved.

In order to achieve the above object of the present invention, there is provided a camera exposure control apparatus for controlling an exposure in accordance with exposure data such that the exposure data is stored upon operation of an operation member and a shutter release button is depressed while the operation member is operated, wherein even if the operation member is released while the release button is released the exposure data is kept stored; thereafter the exposure data is kept stored when the operation member is operated; and the exposure data is deleted when the release button is depressed while the operation member is released.

BRIEF DESCRIPTION OF THE DRAWINGS

FIG. 6 is a block diagram of the circuit shown in FIG. 5.

DESCRIPTION OF THE PREFERRED EMBODIMENTS

Figure 1:
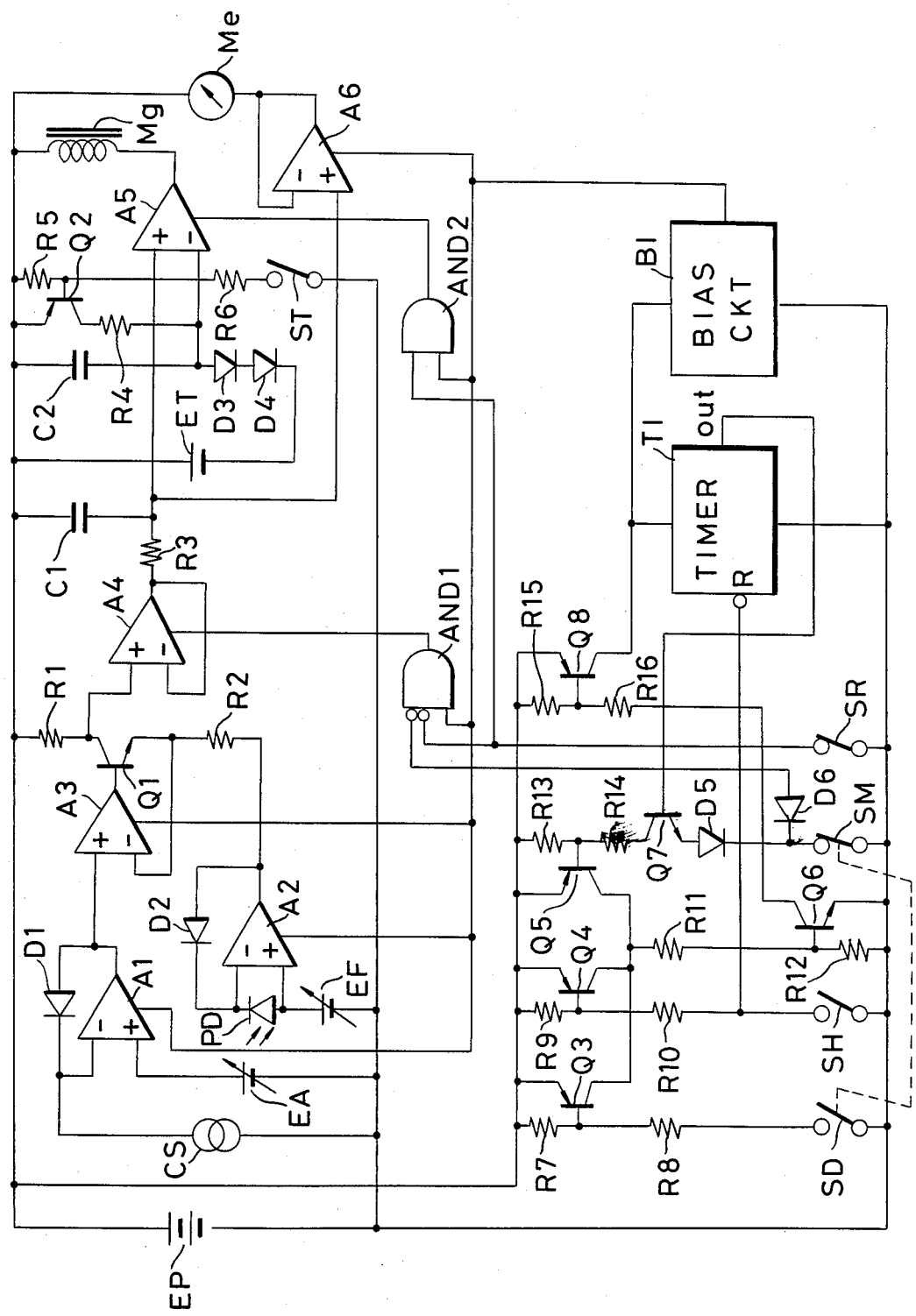
FIG. 1 is a circuit diagram of a camera exposure control apparatus according to an embodiment of the present invention.

FIG. 1 is a circuit diagram of an exposure control apparatus of a single-lens reflex camera according to an embodiment of the present invention. A battery EP is directly connected to all circuits excluding a timer TI and a bias circuit BI. A photodetector PD for receiving light from an object is connected to differential input terminals of a photometric operational amplifier A2. The operational amplifier A2 uses a logarithmic compression diode D2 in a feedback loop and converts a photocurrent flowing through the photodetector PD to a voltage. A power source EF for determining a voltage applied to a noninverting input of the operational amplifier A2 is used to supply aperture step number data of the lens. The power source EF comprises, for example, a variable resistor interlocked with an aperture ring and a constant current source. When an F-number is decreased, a voltage of the power source EF is lowered. An operational amplifier A1 generates a voltage obtained by adding a forward bias voltage of a temperature compensating diode D1 to a power source EA representing film sensitivity data. Reference symbol CS denotes a constant current source for generating a current having the same temperature characteristic as that of the photodetector PD. An operational amplifier A3 constitutes a subtracter together with resistors R1 and R2 and a transistor Q1. A voltage corresponding to a difference between outputs from the operational amplifiers A1 and A2 is applied across the resistor R1. Reference symbol A4 denotes a memory amplifier. When data is to be stored, a bias voltage of the memory amplifier A4 is set by an AND gate AND 1 to zero so as to substantially disconnect the resistor R3 and a memory capacitor C1 from the subtracter. The resistor R3 serves as a ripple resistor for a lowpass filter which is constructed by the resistor R3 and the capacitor C1. The capacitor C1 also serves as a memory cell. A reference power source ET, a timer capacitor C2, diodes D3 and D4, a transistor Q2, resistors R4, R5 and R6, and a trigger switch ST constitute the timer TI. A voltage across the timer capacitor C2 is increased in proportion to a logarithmic value of time elapsed after a trigger switch ST is turned off. This trigger switch ST is turned off in synchronism with movement of a front curtain which is performed in response to depression of the shutter release button. The switch ST is turned on when the user winds a film winding lever (not shown). The noninverting input terminal of a comparator A5 receives a voltage signal from the capacitor C1, and the inverting input terminal of the comparator A5 receives a voltage signal from the capacitor C2 in the timer TI. When a voltage signal from the capacitor C2 is higher than that from the capacitor C1, the comparator A5 generates a low level signal (to be referred to as an "L" level signal hereinafter) to energize a rear curtain magnet Mg so as to hold the rear curtain. When the voltage signal from the capacitor C2 is smaller than that from the capacitor C1, the comparator A5 is inverted to generate a high level signal (to be referred to as an "H" level signal hereinafter). The rear curtain holding magnet Mg is deenergized to move the rear curtain. An operational amplifier A6 comprises a voltage follower for converting the voltage at the memory capacitor C1 to an impedance to drive a meter Me as an exposure meter. The operational amplifier A6 comprises a high-impedance and low-input current operational amplifier so as not to discharge the memory capacitor C1 when data is written in the memory capacitor C1.

When the shutter release button is depressed, power is supplied and photographing is started. More particularly, the power is supplied by a first stroke (first half depression) of the shutter release button. Photographing is started and performed by a second stroke (second half depression) of the shutter release button. The timer TI is turned on by a switch SH which is turned on by the first stroke of the shutter release button. The timer TI is powered through a power source switching circuit comprising resistors R9, R10, R11, R12, R15 and R16 and transistors Q4, Q6 and Q8. An output out from the timer TI goes "H". More particularly, when the switch SH is turned on, the transistor Q4 is turned on through the resistor R10, and the transistor Q6 is then turned on through the resistor R11. Subsequently, the transistor Q8 is turned on through the resistor R16. The power source voltage is applied to the timer TI through the transistor Q8. A reset terminal R of the timer TI is set at "L" when the switch SH is turned on, so that the output from the timer TI goes "H". The timer TI is stopped while the switch SH is on. When the switch SH is turned off, the timer TI starts counting. When a predetermined period of time has elapsed, the output out from the timer TI goes "L". When the output is "H", a transistor Q7 is turned on. When a switch SM is kept on, the transistor Q5 is turned on through the diode D5 and the resistors R13 and R14. When the transistor Q5 is turned on, the power source switching circuit described above is operated. Therefore, when a switch SM is kept on while the switch SH is kept off, the power source voltage is supplied to the timer TI and the bias circuit BI through the transistor Q8 for a period of time determined by the timer TI. The switch SM is turned off upon operation of the memory lock button in FIG. 2. When the switch SM is turned off, an emitter current of the transistor Q7 which flows through the diode D5 is stopped. Accordingly, even if the output out from the timer TI is set at "H", a current will not flow in the base of the transistor Q5 through the resistor R14. As a result, the transistor Q5 is turned off. The switch SM is connected to the AND gate AND 1 through the diode D6. When the switch SM is turned off, the output from the AND gate AND1 goes "L" to disable the memory amplifier A4. When the memory lock button is operated, a switch SD is turned on in synchronism with the switch SM to operate the power source switching circuit through the resistors R8 and R7 and the transistor Q3. When the bias circuit BI receives power from the transistor Q8, the circuit BI generates a bias signal of "H" level to start the operational amplifiers A1, A2, A3 and A6. These operational amplifiers will not be started when the bias signal is set at "L" level and therefore will not consume a current. A switch SR is turned off when a mirror for guiding light to the viewfinder from the photographing lens is removed (to be called a mirror-up operation hereinafter) from an optical path from the photographing lens to the film surface. The switch SR is turned on when the mirror is inserted (to be called a mirror-down operation hereinafter) in the optical path. After the release button is depressed, the AND gate AND1 generates an output of "H" level only when the switches SR and SM are turned on and the bias signal is set at "H" level. The "h" level signal from the AND gate AND1 drives the memory amplifier A4. Therefore, when the shutter is released, or the automatic exposure lock button is locked, or the power is cut off, the memory amplifier A4 is rendered inoperative. An AND gate AND2 generates an "H" level output only when the switch SR is kept off and the bias signal is set at "H" level, thereby operating the comparator A5.

Figure 2:
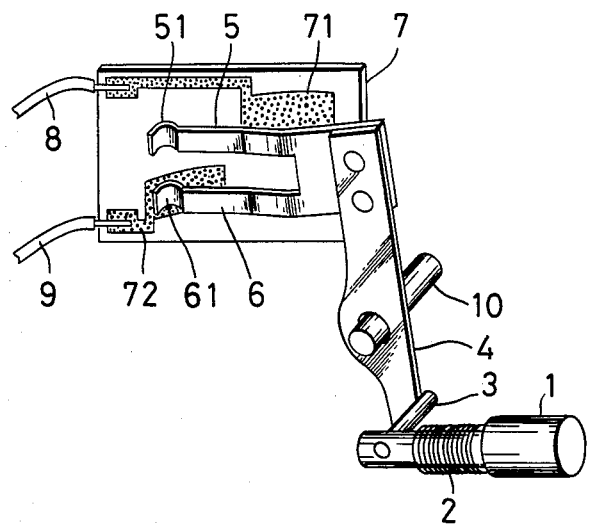
FIG. 2 is a perspective view showing the construction of switches $S_D$ and $S_M$ of FIG. 1.
Figure 3:
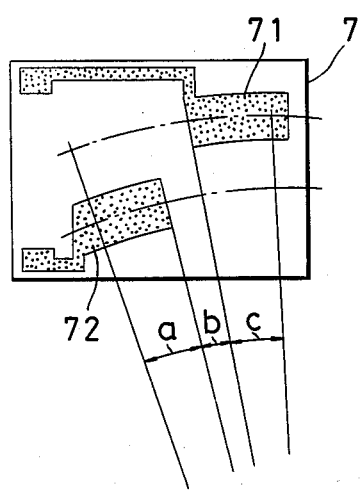
FIG. 3 is a detailed representation of a printed circuit board pattern of FIG. 2.

The operation of the switches SD and SM interlocked with the memory lock button will be described with reference to FIGS. 2 and 3. A memory lock button 1 in FIG. 2 is normally biased outside by a compression spring 2. When the memory lock button 1 is depressed, a lever 4 pivotally engaged with a pin 10 mounted on a camera body is rotated clockwise. Since brushes 5 and 6 are fixed to the lever 4, the brushes 5 and 6 are slidable with the lever 4 along a printed circuit board 7. The printed circuit board 7 has conductor patterns 71 and 72, as shown in FIG. 3. Slidable contacts 51 and 61 of the brushes 5 and 6 are slidable within a range given by regions a, b and c along the corresponding alternate long and short dashed lines, respectively, as shown in FIG. 3. The brushes 5 and 6 are electrically connected to the camera body through the lever 4. A ground terminal GND of the circuit shown in FIG. 1 is grounded through the camera body. The conductor patterns 71 and 72 are connected to the ground terminal GND when they are brought into contact with the brushes 5 and 6, respectively. The brush 5 and the pattern 71 constitute the switch SD, and the brush 6 and the pattern 72 constitute the switch SM. Wires 8 and 9 are soldered to the conductor patterns 71 and 72 of the printed circuit board 7, respectively. Signals from the switches SD and SM are coupled to the circuit shown in FIG. 1. When the memory lock button is not depressed, the slidable contacts 51 and 61 of the brushes 5 and 6 are located within the region a. However, when the memory lock button is depressed, the slidable contacts 51 and 61 are moved to the regions b and c. Since the slidable contact 51 is normally not located on the conductor pattern 71, the switch SD is kept off. At the same time, since the slidable contact 61 is normally located on the conductor pattern 72, the switch SM is kept on. However, when the memory lock button is depressed, the slidable contacts 51 and 61 are moved to the region b, so that the switch SM is turned off. Subsequently, since the slidable contacts 51 and 61 are moved to the region c, the switch SD is turned on. When the slidable contacts 51 and 61 come to the right end of the region c, the memory lock button cannot be further depressed due to the presence of a mechanism (not shown). When the exposure memory lock is performed, the slidable contacts are located in the region c.

The operation of the apparatus having the arrangement described above will be described. In normal photographing mode, the switch SH is turned on by the first stroke of the shutter release button. The transistor Q8 is turned on to energize the timer TI and the bias circuit BI, thereby operating the respective operational amplifiers. The timer TI and the bias circuit BI are kept on while the shutter release button is depressed by the first stroke and during a predetermined period of time (e.g., 16 seconds) after the shutter release button is released. In this case, the meter Me indicates an optimal shutter time, so that the user can check whether or not the optimal shutter time corresponds to a desired shutter time. When the shutter release button is depressed after framing, the switch SR is turned off when a mirror-up operation is started. The AND gate AND1 generates an "L" level output, and the AND gate AND2 generates an "H" level output. The amplifier A4 is thus rendered inoperative, but the comparator A5 is rendered operative. As a result, the voltage at the capacitor C1 is held. Consequently, a problem can be avoided in which a photometric system including the photodetector PD placed in the viewfinder of a single-lens reflex camera is shielded against the light from the object by the mirror-up operation. Thereafter, when the mirror-up operation is completed, a front curtain (not shown) starts moving, and the switch ST interlocked with the front curtain is turned off. The comparator A5 compares the voltage stored in the capacitor C1 with that of the capacitor C2. When the voltage of the capacitor C2 becomes lower than that of the capacitor C1, the comparator A5 goes "H" to deenergize the magnet Mg, thereby moving the rear curtain. Even when the comparator A5 does not immediately generate the "H" output due to e.g. a dark object, the timer TI will be turned off after the predetermined period of time if the switch SH is turned off by releasing the shutter release button from the first stroke. Then the transistor Q8 is turned off to set the output from the bias circuit BI at "L" level. The comparator A5 is rendered inoperative, i.e., generates the "H" level output. The magnet Mg is then deenergized to move the rear curtain, so that the shutter curtain will not be kept open.

Figure 4:
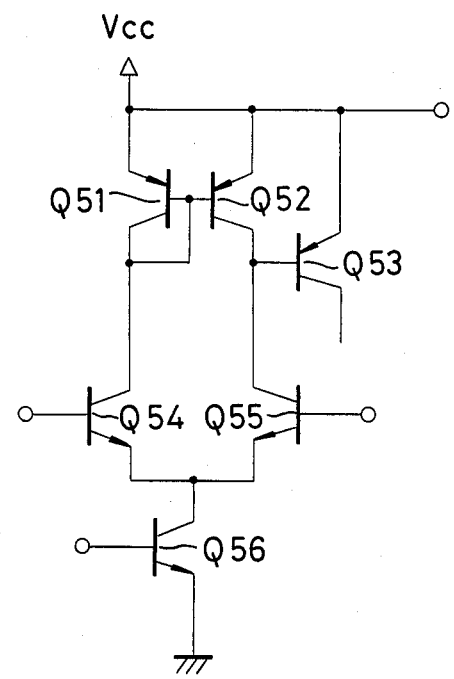
FIG. 4 is a circuit diagram showing the arrangement of an input stage of a comparator A5 and an operational amplifier A6.

The operation will be described wherein the memory lock button is depressed. After the circuit is rendered operative upon depression of the release button by the first stroke, the object for data storage is aligned at the center of the viewfinder and the memory lock button is depressed. The brush is moved from the region a to the region b to turn off the switch SM. When the switch SM is turned off, the amplifier A4 is rendered inoperative through the diode D6 and the AND gate AND1 shown in FIG. 1. In other words, desired data is written. At the same time, the transistor Q5 is turned off through the diode D5, the transistor Q7 and the resistors R14 and R13, so that the transistor Q8 is turned off if the switch SH is not turned on (i.e., if the shutter release button is not depressed by the first stroke). In this case, the timer TI and the bias circuit BI are not energized, and the bias voltage applied to the respective amplifiers is stopped. As previously described, the bias voltage at the memory amplifier A4 is thus kept at zero, an output therefrom is cut off, and the capacitor C1 will not discharge. When an input stage for the comparator A5 and the operational amplifier A6 is arranged as illustrated in FIG. 4, a discharge loop is not formed. FIG. 4 shows the circuit arrangement of the input stage for the comparator A5 and the operational amplifier A6. The noninverting input to the comparator A5 or the amplifier A6 corresponds to a base input to a transistor Q54, and the inverting input thereto corresponds to the base input to a transistor Q55. A differential stage current is determined by a transistor Q56, the base of which is connected to a constant current circuit (not shown) which is controlled by the bias circuit BI. The collector of a transistor Q53 is connected as an output of the input stage to an output stage circuit. An output from the output stage circuit corresponds to the output from the comparator A5 and the amplifier A6. The noninverting input transistor Q54, and the inverting input transistor Q55 comprise npn transistors, respectively. The transistor Q56 for determining the differential stage current comprises an npn transistor. Transistors Q51 and Q52, the collectors of which being connected to transistors Q54 and Q55, respectively, comprise pnp transistors. The transistor Q53 connected to the output stage comprises a pnp transistor. Therefore, a discharge loop cannot be obtained. Even if the operational amplifiers A4, A5 and A6 connected to the capacitor C1 are rendered inoperative, data stored in the capacitor C1 will not be erased. In this manner, all the circuits including the amplifiers A4, A5 and A6 shown in FIG. 1 consume only a leakage current. When the memory lock button is further depressed, the brushes move to the region c to turn on the switch SD. The transistors Q3, Q6 and Q8 are turned on to start the bias circuit BI. Accordingly, the "H" level output from the bias circuit BI drives the amplifiers A1, A2, A3 and A6, but cannot drive the amplifier A4 since the switch SM is kept off. The amplifier A6 causes the voltage data of the capacitor C1 which has been written when the region b was selected to be indicated at the meter Me. In this case, since the capacitor C1 is charged with an input current to the amplifier A6, a current flowing through internal transistors of the amplifier A6 which correspond to the transistors Q56 and Q54 shown in FIG. 4 should be minimized to reduce an input current to the amplifier A6. Under this condition, the charge in the capacitor C1 will not substantially change. The transistors Q54 and Q55 may comprise FETs, respectively. The exposure memory lock is performed irrespective of the switching state of the switch SH, and a corresponding shutter time is indicated.

In order to continue the exposure memory lock thereafter, the memory lock button is kept depressed, or the memory lock button is released after the shutter release button is released. The former method is conventionally used, and a detailed description thereof will be omitted. In the latter method, the brush is moved into the region b when the memory lock button is released, so that all the transistors Q3 to Q8 are turned off. The timer TI and the bias circuit BI are deenergized, and the bias signals of the respective operational amplifiers are kept "L", so that a storage content is kept stored. Even when the brush is further moved into the region a, the timer TI, the bias circuit BI and the respective operational amplifiers are still kept inoperative, since the timer TI was rendered inoperative when in the region b. If the user wishes to visually observe a storage content, he depresses the memory lock button again to move the brush into the region c. The stored value is indicated by the meter Me. When the shutter release button is depressed at this exposure value, the shutter release button is depressed after the memory lock button is depressed, thereby performing the same operation as photographing with the normal exposure memory. However, the exposure depends upon a written shutter time. In order to cancel the storage content, the release button is depressed by the first stroke in the same manner as normal photographing after the memory lock button depression is released. In this manner, memory hold or cancel is performed in accordance with depression/non-depression of the memory lock button prior to the first stroke depression of the shutter release button.

In summary, power is supplied upon first half depression of the shutter release button, and the object is aligned at the center of the viewfinder under depression of the exposure memory lock. The memory lock button is depressed such that the brush is temporarily moved to the region b or c while the shutter release button is depressed by the half stroke to drive the timer TI and the bias circuit BI. The exposure memory lock is completed by the series of operations described above. Subsequently, the object is framed for photographing and the shutter release button is depressed by the half stroke after the memory lock button is depressed such that the brush is moved to the region b or c again. Thereafter, the shutter release button is completely depressed to finish photographing. When the same photometric value is also used in the next photographing, the shutter release button is released and then the memory lock button is released, thereby maintaining the exposure memory lock. In order to cancel the exposure memory lock, the shutter release button is depressed by the first stroke while the memory lock button is released.

Figure 5:
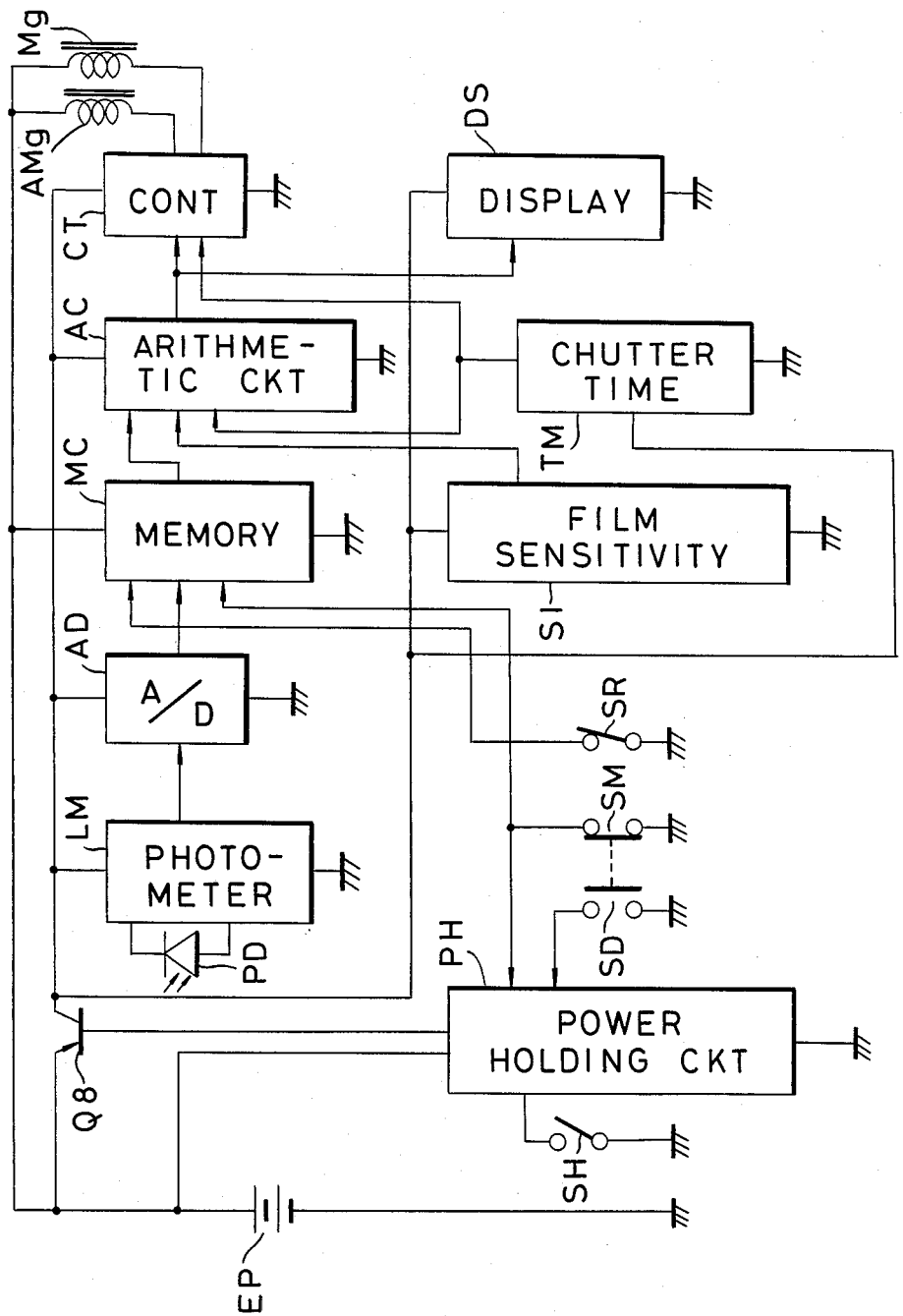
FIG. 5 is a block diagram of a camera exposure control apparatus according to another embodiment of the present invention.

FIG. 5 is a block diagram of another embodiment according to the present invention. The same reference numerals and symbols as in FIG. 5 denote the same parts as in FIG. 1. Referring to FIG. 5, a power source transistor Q8 is controlled by the power source switching circuit shown in FIG. 1 (excluding the transistor Q8) and power holding circuit PH comprising transistors Q3, Q5 and Q7, a diode D5, resistors R7, R8, R13 and R14 and a timer TI. The power source transistor Q8 supplies power to a photometric circuit LM, an A/D converter AD, an arithmetic circuit AC, a control circuit CT, a film sensitivity data generator SI, a shutter time data generator TM and a display circuit DS. The exposure control is performed such that object brightness data received by the photodiode PD is converted by the photometric circuit LM to a voltage signal, and that this voltage signal is converted by the A/D converter AD to digital data. This digital data is supplied as object brightness data (BV value) to the arithmetic circuit AC through a memory circuit MC for storing the object brightness data when the mirror-up operation is performed or the memory lock button is depressed. The film sensitivity data and the shutter time data are supplied as digital data from the circuits SI and TM to the arithmetic circuit AC. The arithmetic circuit AC determines an optimal aperture in accordance with the object brightness data, the film sensitivity data and the shutter time data. The optimal exposure data is supplied to the control circuit CT and the display circuit DS. The circuit CT controls an aperture control magnet AMg to obtain the optimal F-number. The display circuit DS displays the optimal F-number. The shutter time data is supplied from the circuit TM to the circuit CT. The circuit CT controls a rear curtain magnet Mg to determine the shutter time. The power holding circuit PH causes the transistor Q8 to turn on when the switch SH is turned on after the shutter release button is depressed by the first stroke. The transistor Q8 is kept on for a predetermined period of time after the switch SH is turned off. Thereafter, the transistor Q8 is turned off, and the circuit PH itself is also turned off. The switch SD is turned on and the switch SM is turned off upon the depression of the memory lock button. When the switch SM is turned off, the memory circuit MC is held in the memory hold state, and the power holding circuit PH is turned off. However, the circuit PH is kept on when the switch SH is kept on. The switch SD is turned on at the same timing as in the circuit (FIG. 1) to turn on the circuit PH after the switch SM and then the circuit PH are turned off upon operation of the memory lock button. The switch SR sets the memory circuit MC in the memory hold state irrespective of the operation of the power holding circuit PH. The memory hold operation is performed upon operation of the shutter release button. The memory circuit MC is directly energized by the power source EP without being through the transistor Q8. A latch circuit comprises a CMOS flip-flop or the like and stops generating clocks in the memory hold mode. The memory circuit MC consumes only the leakage current. The brightness data input to the arithmetic circuit AC is held in the high-impedance state when power is OFF.

FIG. 6 is a block diagram showing the internal arrangement of the memory circuit MC. the memory circuit MC comprises an A/D converter AD, latch circuits L1, L2, L3 and L4 which generate a 4-bit output signal and latches output signals from the A/D converter AD, and an AND gate AND3 for controlling latching of the latch circuits L1, L2, L3 and L4. The latch circuits L1, L2, L3 and L4 receive clock pulses through the AND gate AND3 to latch the output signal from the A/D converter AD. Therefore, when the AND gate AND3 stops generating the clock pulses, the latch circuits L1, L2, L3 and L4 stop latching the output signal from the A/D converter AD. The input terminals of the AND gate AND3 are connected to receive inverted signals of the switches SM and SR. The operation of the switches SM and SR is the same as that in FIG. 1.

I claim:

1. A camera having a photographing operation member movable between first, second and third positions, photometric means for generating a photometric output by measuring brightness of an object when said photographing operation member is located in the second position, and control means for controlling an exposure when said photographing operation member is located in the third position, wherein said photometric means and said control means are disabled when said photographing operation member is located in the first position, said camera comprising:

(a) a memory operation member having a first position and a second position;
(b) memory means;
(c) storing means for storing the photometric output in said memory means in response to placement of said memory operation member in its second position;
(d) said exposure controlling means, when said memory operation member is located in its second position, controlling the exposure in accordance with the content of said memory means in response to placement of said photographing operation member in its third position;
(e) said memory means holding the stored photometric output when said photographing operation member is located in its first position or its third position; and
(f) said storing means replacing the content of said memory means when said memory operation member is in its first position and said photographing operation member is placed in its second position.

2. A camera according to claim 1, wherein said storing means includes:
transmitting means for transmitting the photometric output to said memory means when said photographing operation member is located in its second position.

3. A camera according to claim 2, wherein said storing means further includes means for preventing said transmitting means from transmitting the photometric output to said memory means when said photographing operation member is placed in its second position when said memory operation member is located in its second position.

4. A camera according to claim 1, wherein said memory means holds the stored photometric output when said photographing operation member is placed in its second position when said memory operation member is located in its second position.

* * * * *